RUDOLF E. GARTZKE
INVENTOR

Sept. 26, 1967  R. E. GARTZKE  3,343,768
AIRCRAFT
Filed March 14, 1966  2 Sheets-Sheet 2

RUDOLF E. GARTZKE
INVENTOR

BY *Keith Seloff*
ATTORNEY

United States Patent Office 3,343,768
Patented Sept. 26, 1967

3,343,768
AIRCRAFT
Rudolf E. Gartzke, 2326 Superior St., Madison, Wis. 53704, assignor of thirty percent to Walter R. Gartzke, Madison, Wis.
Filed Mar. 14, 1966, Ser. No. 534,168
4 Claims. (Cl. 244—130)

This invention relates to aircraft embodying means for minimizing drag, and more particularly relates to aircraft embodying linearly movable leading edge means.

The force opposing forward flight of aircraft through atmosphere comprises inertial and viscous component forces known respectively as pressure drag, resulting from air of unequal mean density acting at the leading and trailing projected surfaces of the craft relative to the direction of flight, and skin friction or viscous drag, resulting from different air velocity between the stream flowing freely past the aircraft and that at the interfacial surface.

The viscosity of a gas such as air changes only slightly relative to density change so that at high altitudes rarified air of little density exhibits viscosity comparatively little reduced to that at sea level, the result being that the viscous component of drag becomes increasingly large relative to the inertial component with increase in altitude. The alternate conditions that exist when the viscous component of drag is grossly preponderant and when the inertial component is grossly preponderant correspond approximately to conditions of laminar flow and turbulent flow, respectively, the parameter of general applicability to fluid flow, Reynold's number, being inversely proportional to the viscosity of the medium and directly proportional to its density and to the size and the relative velocity of an object having an interface with the medium.

At low Reynold's numbers corresponding to laminar flow, drag is directly proportional to the viscosity of the medium and to the size and the relative velocity of the object. At high Reynold's numbers corresponding to turbulent flow, a simple relationship does not exist, drag being only approximately directly proportional to the fluid density and to the square of the relative velocity of an object and to the square of its size.

For aircraft approaching sonic speed at very high altitudes the viscous component of drag is preponderant, and at lower altitudes the inertial component is preponderant, the craft being accompanied by a pressure front propagated and advancing forward from the leading surfaces which is greater in magnitude than the pressure trailing the craft and which increases in magnitude with increase in sub-sonic speed. At sonic speed and above a pressure front cannot be propagated in advance of the craft.

Reduction of the inertial or pressure component of drag on airframes has been accomplished by fairing all external surfaces, reducing frontal area, sweeping wings rearwardly; viscous drag has been minimized by reducing the size of surface protuberances to dimensions which extend only to within the boundary layer of air enveloping the craft. Caddell United States Patent 3,008,673 further discloses reciprocating leading edge means to effect reduction in drag by the order of one-half, and various disclosures of apertured wing surfaces for exhausting air into the boundary layer to reduce skin friction have been made, e.g. Massey United States Patent 1,820,919.

This invention provides high velocity linear movement to a leading edge of a wing to effect reduction in drag and further provides entry of forced air into the boundary layer to effect reduction in skin friction. In addition, a rotating member within the aircraft also provides a stabilizing gyroscopic effect on the craft.

It is an object of this invention to provide a linearly movable leading edge means for aircraft to effect reduction in air density differential between the leading and trailing edges of the craft.

It is another object of this invention to provide entry air from the surface of an airfoil rearward the leading edge into the boundary layer to effect reduction in surface friction.

It is another object of this invention to provide a gyroscopically stabilized aircraft.

Other objects will become apparent from the following detailed description and from the drawings in which like numbers refer to like parts and in which.

Figure 1:
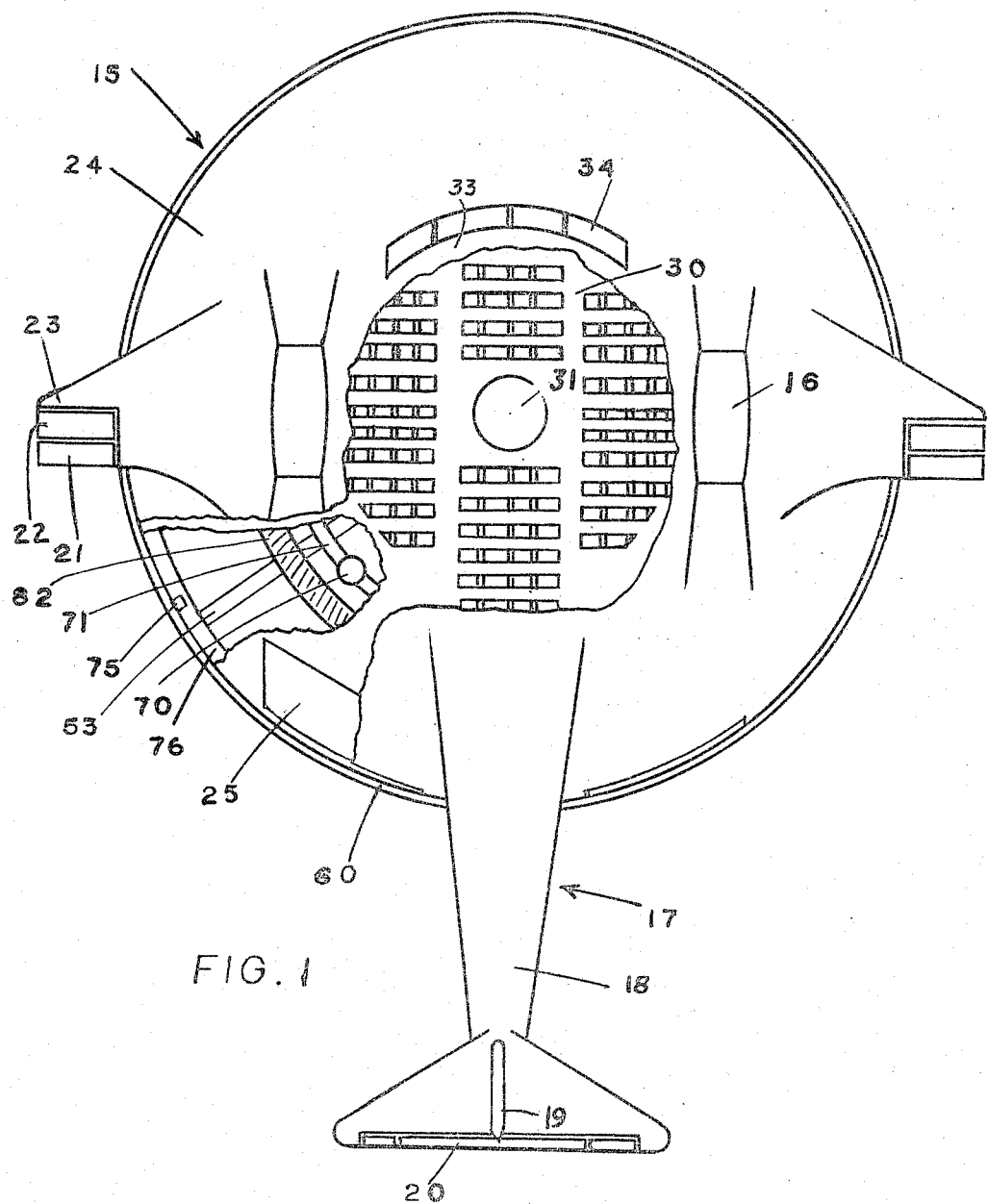
FIGURE 1 is a plan view of an aircraft of this invention in partial cutaway.

Referring now to FIGURE 1, aircraft 15 is configured with propulsion engines 16 disposed above and below airfoil surfaces of the craft and outboard from the longitudinal centerline of the craft. Tail assembly 17 comprising boom 18, rudder 19, elevators 20 together with trimming tabs and stabilizing and control surfaces of conventional design, is disposed as the rearmost extremity of aircraft 15 along the centerline of the craft. Ailerons 21, flaps 22 and supporting mounting appendage 23 therefore are disposed at the outermost lateral extremities of aircraft 15 on either side of lift surface 24. As shown lift surface 24 is configured with a substantially circular periphery, and in conjunction with tail assembly 17 provides a resultant lift force which acts through the center of gravity of aircraft 15. Flaps 25 disposed adjacent the trailing peripheral edge portion of surface 24 enable the airfoil configuration of craft 15 to be altered and in conjunction with flaps 22 may be used to provide increased lift during aircraft take-off and landing operations. Passenger accommodations and cargo space 30 is provided in an annular interior volume of aircraft 15 around core 31. Space 30 and flaps 25 are shown in one cutaway representation in FIGURE 1. The pilot's cockpit 33 is disposed in the forward portion of craft 15 with windows 34 being provided therein, additional windows being provided in surface 24 above the passenger and cargo spaces 30 if desired. The peripheral edge of rotor 35 is shown disposed as the radial extremity of craft 15 between appendages 23 and boom 18, and it is essential that at least the foremost semi-circular peripheral portion be exposed to the airstream.

Figure 2:
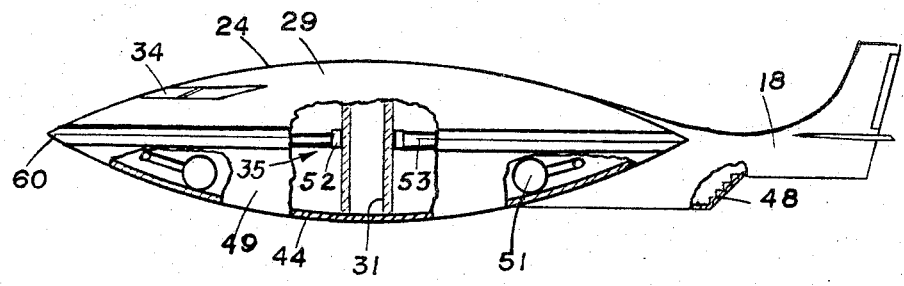
FIGURE 2 is a side elevation in partial cutaway of an aircraft of FIGURE 1.
Figure 3:
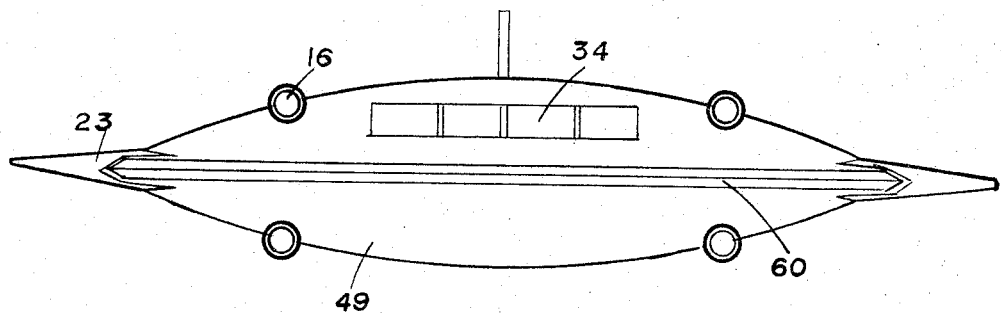
FIGURE 3 is a front elevation of the aircraft of FIGURE 1.

In FIGURE 2 lower airfoil surface 44 is shown configured with similar periphery to that of upper surface 24 but with lesser concavity and therefore lesser surface area than the upper surface, the result being to cause a net upward resultant lifting force by flow of air over the two surfaces, i.e. the velocity of air past the greater length of surface 24 results in lesser air pressure on the projected area of that surface. Upper body 29 and lower body 49 of aircraft 15 are connected through core 31, appendages 23 and tail boom 18. Cargo and passenger space, not shown are in lower body 49 may be provided in similar manner to that shown for space 30 in the upper body 29 passenger accomodations. Door 48 is shown in boom 18 for loading and unloading passengers. Loading and exit means may be provided elsewhere in the craft as desired. Retractable landing gear 51 is shown in retracted position in fore and aft locations in lower body 49. The landing gear is of conventional design and may be disposed in craft 15 either as a three point system, or as a four point system as shown, or in other suitable manner.

Rotor 35 is disposed between upper body 29 and lower body 49 extending from hub bearings 52 journaled on core 31 to the periphery of craft 35 and comprises radial spokes 53. Bearings 52 may be conventional anti-friction bearings designed to operably withstand both radial and thrust loads. Hub bearings for helicopter rotors operating at conditions of load comparable to those encountered in the craft of this invention can be employed. Spokes 53 are shown tapering from greater web thickness at the hub of rotor 35 to lesser thickness at the peripheral end to impart substantial rigidity to rotor 35. The effectiveness of spokes 53 in providing operation of rotor 35 in a plane is augmented by an air bearing being provided at the peripheral extremity of rotor 35.

Figure 4:
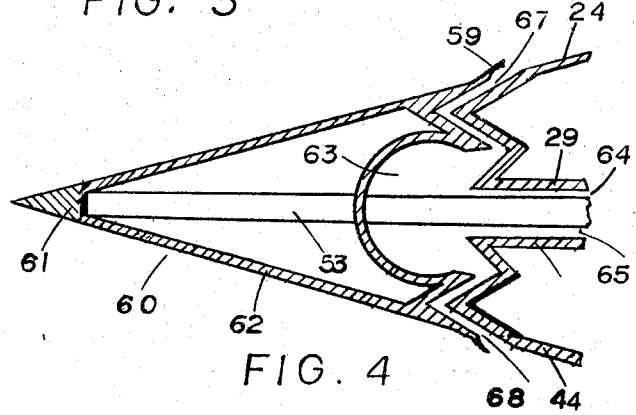
FIGURE 4 is a cross-sectional elevation of the detail of the peripheral edge of the aircraft of FIGURE 1.

As shown in FIGURE 4 the peripheral and extremity of rotor 15 comprises spoke 53 terminating in rim 60. Rim 60 comprises apex member 61 of tough heat and corrosion resistant material such as a stainless steel, to which is integrally joined tapered fairing 62 which extends into close proximity to the peripheral surfaces 24 of upper body 29 and 44 of lower body 49. The surface of fairing 62 is substantially coincident with extensions of the surfaces of upper body 29 and lower body 49 and provides smooth transition for flow of boundary air from fairing 62 onto surfaces 24 and 44, with the provision however, that the inner peripheral surface extremity 59 of fairing 62 is preferably flared outward slightly as shown to insure that air is aspirated from the annulus between fairing 62, upper body 29 and lower body 49. The flared configuration of the inner peripheral surface extremity 59 desirably does not exceed the thickness of the boundary layer of air at that location, but may be of any dimension which provides optimum performance of the craft in flight. The trailing edges of surfaces 24 and 44 are disposed to shield surface extremity 59 of rim 60 from projecting beyond the airfoil surface and boundary layer into the freely flowing airstream. Preferably the trailing edges of surfaces 24 and 44 extend peripherally outward sufficiently to cover surface extremity 59 as fairings and prevent disturbance of the flow of air over the fairings which shield rim 60 at the trailing edges of bodies 29 and 49. To minimize the disturbance of air flowing between appendages 23 and rim 60 where the rim passes through the appendages it is desirable to provide a passage between rim 60 and appendages 23 configured as a venturi opening, i.e. with entrances converging uniformly into a throat in which air pressure is minimum and air velocity maximum, and from which air flows through an exit opening which diverges uniformly at not more than about 15°. The projection of the fairings shielding rim 60 at the trailing edges of bodies 29 and 49 is desirably terminated adjacent the throat of venturi opening to provide minimum disturbance of air at that location so as not to contribute to drag. Central chamber 63 of the inner peripheral extremity of rim 60 is configured as an annular cavity into which high pressure air is admitted from ducts 64 and 65 disposed in upper body 29 and lower body 49, respectively. Air is ejected from chamber 63 through annular slot 67 between upper body 29 and rim 60 and annular slot 68 between lower body 49 and rim 60. The configuration and disposition of slots 67 and 68 are symmetric with respect to each other so that upon rotation of rim 60, two air bearings are provided by slots 67 and 68 which support and stabilize rotor 35 and rim 60 in a plane of rotation and dampen oscillation relative to bodies 29 and 49. To assure against radical imbalance or oscillation between the body of the craft and the rotating members, additional mechanical bearings for limiting movement between rotating and non-rotating members relative to the plane of rotation of rotor 35 are desirably provided. Thrust bearings 70 are interiorly disposed in craft 35 opposite member intermediate core 31 and the craft periphery, each facing annular races 71 fixed to spokes 53 of rotor 35. Thrust bearings 70 comprise rollers adapted to be brought into contact with race 71 simultaneously, or be withdrawn from contact therewith. Such movement may be accomplished in suitable manner, for example by thrust bearings 70 comprising hydraulic pistons actuated by suitable servo-controls. Thrust bearings 70 contact with races 71 is primarily a measure used only when forces are to be imposed on the craft which could produce undesirable stress in the rotating members, as for example when landing or during taxiing. Thrust bearings 70 may also be used to dampen oscillation in rotor 35 during flight but are desirably not to be employed during normal flight conditions. To provide fixed oscillation dampening means for rotor 35 a series of uniformly spaced roller bearings 75 are disposed around the perimeter of body 29 and 49 adjacent races 76 affixed to spokes 53 of rotor 35 near the periphery. The spacing between the contact surfaces of bearings 75 and races 76 is slightly less than that of the vertical free motion tolerance in annular ducts 67 and 68 so that interference with vertical motion of the periphery of rotor 35 will occur at bearings 75 and not at the boundary surfaces of ducts 67 and 68. In the craft shown, bearings 75 are disposed in opposed arrangement on bodies 29 and 49 at peripheral locations on the longitudinal axis of craft 15 and at 60° intervals therefrom. Thrust bearings 70 are shown disposed at 45° intervals from the longitudinal axis of craft 15.

Figure 5:
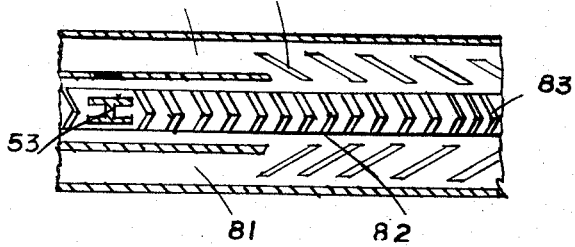
FIGURE 5 is a cross-sectional elevation of a portion of an embodiment of a rotor propulsion means for an aircraft of this invention.

In FIGURE 5 a turbine drive for propelling rotor 35 and rim 60 around core 31 is shown. Compressed air is withdrawn through ducts not shown, from the compressor stage of jet engines 16 and exhausted through ducts 64 and 65 to chamber 63 in rim 60 and through annular manifolds 80 and 81 fixed to bodies 29 and 49 respectively and disposed in close adjacency to turbine wheel 82. Turbine wheel 82 may be a unitary member as shown with fixed reaction vanes 83 disposed intermediate spokes 53 of rotor 35 or may comprise axially separated portions disposed on either face of rotor 35. Deflecting vanes 84 are disposed within manifolds 80 and 81 and are variable, controlled pitch means which may be of conventional design. High pressure air exhausted through ducts 80 and 81 from compressor stages of engines 16 impinges upon deflecting vanes 84, thereby imparting a rotational force to bodies 29 and 49 about the axis of core 31 and causing the air to be deflected to impinge upon reaction vanes 83 of turbine wheel 82 at an angle to effect maximum transfer of kinetic energy between the impinging air and wheel 82. Control of pitch of deflecting vanes 84 may extend through 90° or more to enable dynamic braking of rotor 35 to be effected by subjecting turbine wheel 82 to reverse thrust from the compressed air driving fluid, or to enable either one of ducts 80 and 81 to be used alone to supply air to turbine wheel 82 by reversing the pitch of deflecting vanes 84 associated with the duct which is not used. Design of gas turbine means for this invention will be within the ability of one skilled in the design of aircraft propulsion and control means. Energy of rotation imparted to bodies 29 and 49 may be equalized by expedients such as by employing correctional settings for trimming tabs in tail assembly 17, employing slipstream deflecting means, not shown, or by establishing the thrust of engines 16 non-parallel to line of flight and centerline of aircraft 15, any of which expedients will provide counter-rotational effort to bodies 29 and 49 of craft 35. The propulsion means described is suitable for use when engines 16 comprise gas turbine means, or may be suitable when auxiliary air compressor means is provided in conjunction with other prime power means. Alternatively other means may be employed for turning rotor 35, for example, electric induction motor windings may be affixed to rotor 35 with stator windings being affixed to either of bodies 29 and 49. A motor-generator means for supplying current to the winding could be provided separately or in conjunction with the prime power means. Bearing 31 may be modified to be attached to bodies 29 and 49 without extending therethrough or may be increased in diameter to approach in diameter the peripheral diameter of craft 15. It is preferred that rotor 35 be rotated with peripheral velocity which is sufficient to stabilize craft 35 without being so excessive as to render handling of the craft difficult. For example rotor 35 may be 92 feet in diameter and be rotated 170 revolutions per minute with a peripheral velocity of 558 miles per hour. The design of the rotor and the peripheral velocity may be selected to impart the optimum handling characteristics to craft 35. The optimum flow of air from ducts 67 and 68 into the boundary layer to decrease drag would best be determined empirically with each craft. Apex member 61 preferably is made from material which resists high temperature without excessive loss of strength and is sharply pointed as shown to most effectively move in relation to the pressurized stream of air immediately adjacent the leading edge of the craft.

If spokes 53 are sufficiently rigid as not to require auxiliary support means the need for thrust bearings 70 and peripheral bearings 75 may be obviated, or either the peripheral air bearing or the core bearing may be sufficient under given circumstances to obviate the need for other bearing means.

Craft 15 may be altered within the scope of this invention to provide multiple counter-rotating rotors, preferably in non-intersecting planes, thereby reducing or eliminating a resultant rotational force from being imparted to bodies 29 and 49, and the rotors may be disposed to rotate either about coincident or non-coincident axes or to be enclosed in fairings to provide only laterally and rearwardly moving peripheral surfaces. It is also within the scope of this invention to provide a cabin wherein the enclosing structure does not contribute to lift surfaces. All such modifications will be apparent to one skilled in the art.

While certain modifications and embodiments of the invention have been described, it will be understood that variations will be apparent to one familiar with the art and that the invention is not limited except by limitations contained in the appended claims.

I claim:
1. An aircraft comprising in combination propulsion means, control surfaces moveable by pilot manipulation, a body portion exteriorly configured to comprise an airfoil for providing aerodynamic lift to said aircraft in flight and interiorly configured to receive useful load, and traversable leading edge means extending immediately adjacent and forward of said body portion disposed to rotate about at least one axis of rotation substantially parallel to the vector of aerodynamic lift for said aircraft, said leading edge of said means being linearly and non-reciprocably traversable relative to said airfoil configuration of said body substantially along the transverse dimension of said airfoil configuration thereby to effect reduction in aerodynamic drag on said aircraft.

2. The article of claim 1 wherein said traversable leading edge means comprises driving mechanism for imparting and sustaining rotational motion of said means about said axis of rotation.

3. The article of claim 1 wherein air is ejected from said aircraft intermediate said traversable leading edge means and said body thereby effecting reduction in aerodynamic drag on said aircraft and stabilizing said traversable leading edge means in a plane of rotation.

4. The article of claim 1 wherein said traversable leading edge means comprises bearing mechanism for supporting said means relative to said body portion and stabilizing rotation of said means in a plane.

References Cited

UNITED STATES PATENTS

| | | | |
|---|---|---|---|
| 1,426,907 | 8/1922 | Ramsey. | |
| 1,712,529 | 5/1929 | Tallei | 244—39 X |
| 2,176,542 | 10/1939 | Nicholson | 244—39 |
| 2,432,775 | 12/1947 | Lennon | 244—39 X |
| 3,028,129 | 4/1962 | Faillie | 224—130 X |

FOREIGN PATENTS 799,420    4/1936    France.

MILTON BUCHLER, *Primary Examiner.*

B. BELKIN, *Assistant Examiner.*